April 9, 1929.   O. H. FLODIN   1,708,205
SPECTACLE TEMPLE
Filed Aug. 17, 1925
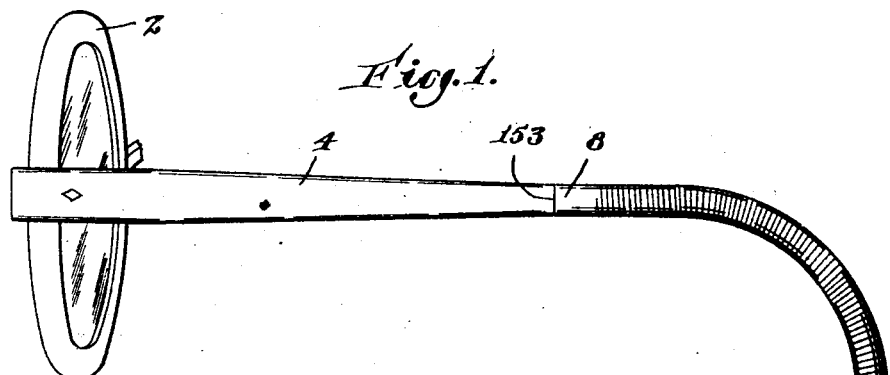
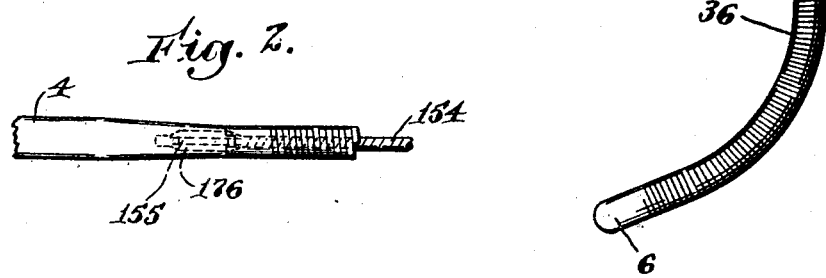
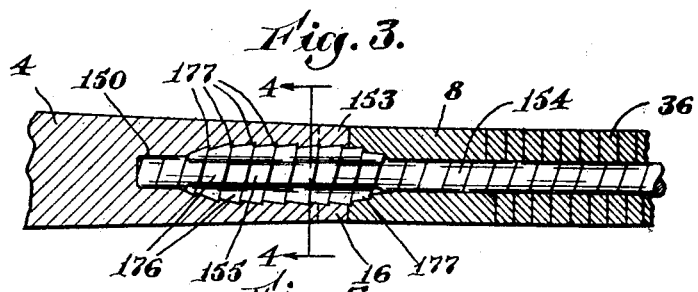
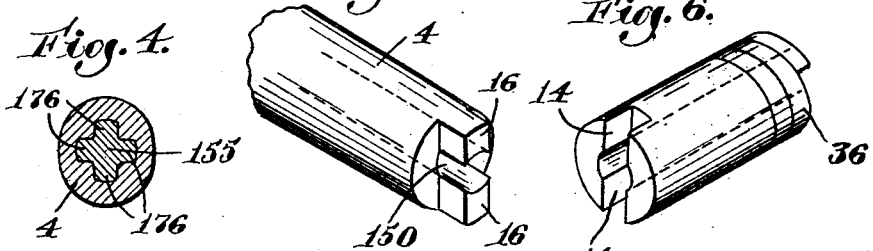
Inventor
Oscar Harry Flodin
by David Rines
Attorney Patented Apr. 9, 1929.

1,708,205

UNITED STATES PATENT OFFICE.

OSCAR HARRY FLODIN, OF ROCHESTER, NEW YORK, ASSIGNOR TO BAUSCH AND LOMB OPTICAL COMPANY, OF ROCHESTER, NEW YORK, A CORPORATION OF NEW YORK.

SPECTACLE TEMPLE.

Application filed August 17, 1925. Serial No. 50,543.

The present invention relates to spectacle temples, and more particularly to temples of the cable type. From a more limited aspect, the invention relates to cable temples comprising non-metal material reinforced by metal cores.

A well known cable temple of the above-described character is provided with a forward non-metal member the rear end of which is provided with a bore, and a metal cable ear hook the forward end of which is secured in the bore. A non-metal cable is mounted over the rearward projecting portion of the metal cable. One of the defects of this temple is the weak joint between the non-metal forward portion and the metal and the non-metal cables that extend rearward therefrom.

One of the objects of the present invention, therefore, is to strengthen the joint between the non-metal forward portion and the metal cable, and between the non-metal forward portion and the non-metal cable.

To these ends, a feature of the invention resides in striking or swaging a fin or fins out of the forward portion of the metal cable. Owing to the cable character of the metal the fin or fins become automatically provided with corrugations that bite into the walls of the bore provided at the rear of the non-metal forward portion and thus improve the efficiency of the joint. A further feature contemplates the provision of a tongue-and-groove connection between the forward non-metal member and the non-metal cable for locking these non-metal parts together.

With these and other objects in view, the invention consists of the improved spectacle temple a preferred embodiment of which is hereinafter described, illustrated in the accompanying drawings and defined in the appended claims.

In the accompanying drawings, Fig. 1 is an elevation of a cable temple constructed according to a preferred embodiment of the present invention, shown hinged to a fragment of a lens-holding frame; Fig. 2 is a fragmentary elevation of the same; Fig. 3 is an enlarged longitudinal section of the fragment illustrated in Fig. 2; Fig. 4 is a section taken upon the line 4—4 of Fig. 3; Figs. 5 and 6 are fragmentary perspective views of the rear end of the forward non-metal portion and the forward end of the non-metal cable, respectively; and Fig. 7 is a fragmentary longitudinal section of the rear end of the temple.

The improved cable temple of the present invention comprises a forward portion 4 of plastic, non-metal material, like celluloid, zylonite or other composition. Its outer surface usually tapers from its forward end toward its rear end and its sides are milled. It is shown pivotally connected at its forward end to a lens-holding frame 2 by a hinge (not shown). The rear end 153 of the forward portion 4 is longitudinally bored at 150. The longitudinal bore 150 is of approximately uniform dimension to start with.

The forward end 155 of a flexible, helically wound, reinforcing metal cable rod 154 is struck up or swaged to provide one or more fins 176. Four fins are illustrated. The finned end 155 of the cable rod 154 is then forced by pressure into the bore 150. The fins 176 bite into the walls of the bore 150 and the rod 154 becomes thus locked in place. Owing to the helical nature of the cable of the metal rod 154, the fins 176 become provided with corrugations or projections 177 that bite into the walls of the bore 150 and help to lock the forward end of the rod 154 in position within the bore 150. A very secure locking effect is thus obtained, the metal core projecting rearward beyond the rear end of the forward member 4.

A non-metal tube 36 is cut into helical or cable form to render it yielding. As non-metal material of the above-described character is very resilient and flexible the non-metal tube thus cut is maintained in its helical form by its own resiliency. The rear and the forward ends of the helically cut tube 36 are left uncut to provide sleeves 6 and 8. The metal cable core 154 is mounted in the bore of the tube 36 and the rear end of the core 154 may be secured in the uncut sleeve 6 in any desired manner that forms no part of the present invention such, for example as is disclosed in a copending application by J. W. Welsh, Serial No. 727,961, filed July 24, 1924. The rear end of the metal cable 154 may consist of a solid rod 159 soldered to the cable portion of the core to give greater stiffness. The bore of the sleeve 6 may be closed by a plug, as is also described in the said application.

A groove 14 is cut transversely in the forward end of the forward sleeve 8 into which is fitted a corresponding transversely disposed tongue 16 provided upon the rear end of the forward part 4 of the temple. The tongue-and-groove connection 16, 14, prevents rotative movement of the tube 36 relative to the forward portion 4. The joint is made secure against longitudinal movement by cement, or in any other well known way. Portions of the corrugated fins 176 also bite into the sleeve 8, the more firmly to join the parts together.

From some aspects of the invention, the rear, looped shaped portion of the metal core 154 may be covered by one or more non-metal strands wound into helical form instead of by the spirally cut tube 36. It will be understood also that the invention is not restricted to the exact embodiment thereof that is illustrated and described herein, but is capable of modification in other respects also by persons skilled in the art. All such modifications are considered to fall within the spirit and scope of the invention, as defined in the appended claims.

What is claimed is:

1. A spectacle temple comprising a member adapted to be hinged at the forward end, a reinforcing member projecting rearward beyond the rear end of the first-named member, and a non-metal member mounted on the projecting portion of the reinforcing member, relative rotative movement of the first-named member and non-metal member being prevented by a transversely disposed tongue on one of them fitted into a transversely disposed groove of the other.

2. A spectacle temple comprising a member adapted to be hinged at the forward end, a flexible reinforcing member projecting rearward beyond the rear end of the first-named member, and a flexible non-metal member mounted over the projecting portion of the reinforcing member, relative rotative movement of the first-named member and the non-metal member being prevented by a transversely disposed tongue on one of them fitted into a transversely disposed groove of the other.

3. A spectacle temple comprising a non-metal member bored at its rear end and adapted to be hinged at the forward end, a flexible reinforcing member mounted in the bore having a portion projecting rearward beyond the rear end of the non-metal member, and a flexible non-metal member mounted over the projecting portion of the reinforcing member, one of the non-metal members having a transversely disposed tongue and the other non-metal member having a transversely disposed groove in which the tongue is fitted to prevent relative rotative movement of the non-metal members.

4. A spectacle temple comprising a non-metal member bored at its rear end and adapted to be hinged at the forward end, a reenforcing member mounted in the bore having a portion projecting rearward beyond the rear end of the non-metal member, and a non-metal member mounted over the projecting portion of the reenforcing member, one of the non-metal members having a transversely disposed tongue and the other non-metal member having a transversely disposed groove in which the tongue is fitted to prevent relative rotative movement of the non-metal members.

5. A spectacle temple comprising a member adapted to be hinged at the forward end, a reinforcing member projecting rearward beyond the rear end of the first-named member, and a helical member mounted over the projecting portion of the reinforcing member, relative movement of the first-named member and the helical member being prevented by a transversely disposed tongue on one of them fitted into a transversely disposed groove of the other.

6. A spectacle temple comprising a non-metal member bored at its rear end and adapted to be hinged at the forward end, a helical reinforcing member mounted in the bore having a portion projecting rearward beyond the rear end of the non-metal member, and a helical non-metal member mounted over the projecting portion of the reinforcing member, one of the non-metal members having a transversely disposed tongue and the other non-metal member having a transversely disposed groove in which the tongue is fitted to prevent relative rotative movement of the non-metal members.

7. A spectacle temple comprising a member adapted to be hinged at the forward end, a reinforcing member projecting rearward beyond the rear end of the first-named member, and a helical member mounted over the projecting portion of the reinforcing member, the forward end of the helical member being integrally provided with a sleeve, and the first-named member and the sleeve having a tongue-and-groove connection.

8. An article of the class described comprising a non-metal member, a helical metal member extending into the non-metal member and projecting beyond the non-metal member, the portion of the metal member that extends into the non-metal member being provided with a locking fin that is corrugated due to the helical nature of the metal member.

9. A spectacle temple comprising a non-metal member bored at its rear end and adapted to be hinged at the forward end, a helical metal member mounted in the bore having a portion projecting rearward beyond the rear end of the non-metal member, the portion of the helical member that is mounted in the bore being provided with a locking fin that is corrugated due to the helical nature of the metal member, and a member mounted over the projecting portion of the metal member.

10. A spectacle temple comprising a non-metal member bored at its rear end and adapted to be hinged at the forward end, a helical metal member mounted in the bore having a portion projecting rearward beyond the rear end of the non-metal member, the portion of the helical member that is mounted in the bore being provided with a locking fin that is corrugated due to the helical nature of the metal member, and a non-metal member mounted over the projecting portion of the metal member, the non-metal member having a tongue-and-groove connection.

11. A spectacle temple comprising a non-metal member bored at its rear end and adapted to be hinged at the forward end, a helical metal member mounted in the bore having a portion projecting rearward beyond the rear end of the non-metal member, the portion of the helical member that is mounted in the bore being provided with a locking fin that is corrugated due to the helical nature of the metal member, and a non-metal tube cut into helical form in the bore of which the projecting portion of the metal member is mounted, the forward end of the tube being uncut to provide a sleeve, and the sleeve and the non-metal member having a tongue-and-groove connection.

12. A spectacle temple comprising a member adapted to be hinged at the forward end, a reinforcing member projecting rearward beyond the rear end of the first-named member and a non-metal tube cut into helical form in the bore of which the projecting portion of the metal member is mounted, the ends of the tube being uncut to provide sleeves, and the forward sleeve being secured to the rear end of the first-named member.

13. A spectacle temple comprising a non-metal member bored at its rear end and adapted to be hinged at the forward end, a helical metal member mounted in the bore having a portion projecting rearward beyond the rear end of the non-metal member, the portion of the helical member that is mounted in the bore being provided with a locking fin that is corrugated due to the helical nature of the metal member, and a non-metal tube cut into helical form in the bore of which the projecting portion of the metal member is mounted, the ends of the tube being uncut to provide sleeves, and the rear end of the non-metal member and the forward sleeve having a tongue-and-groove connection.

14. An article of the class described comprising two non-metal members and a member extending into the non-metal members for joining the non-metal members together, the extending member being provided with one or more locking fins each biting into both non-metal members.

15. A spectacle temple comprising a non-metal member bored at its rear end and adapted to be hinged at the forward end, a reinforcing member mounted in the bore having a portion projecting rearward beyond the rear end of the non-metal member, and a non-metal member mounted over the projecting portion of the metal member, the reinforcing member being provided with one or more locking fins each biting into both non-metal members.

16. A spectacle temple comprising a non-metal member bored at its rear end and adapted to be hinged at the forward end, a helical metal member mounted in the bore having a portion projecting rearward beyond the rear end of the non-metal member, and a non-metal tube cut into helical form in the bore of which the projecting portion of the metal member is mounted, the ends of the tube being uncut to provide sleeves, the first-named helical member being provided with one or more locking fins each biting into both non-metal members.

17. A spectacle temple comprising a member adapted to be hinged at the forward end, a flexible reinforcing member having a body portion projecting rearward beyond the rear end of the first-named member, and a flexible non-metal member mounted over the projecting portion of the reinforcing member, the reinforcing member being provided at its free end with a portion that is less flexible than the body portion.

18. A spectacle temple comprising a non-metal member adapted to be hinged at the forward end, a reinforcing member projecting rearward beyond the rear end of the non-metal member, and a non-metal tube member mounted on the projecting portion of the reinforcing member, one of the non-metal members having a locking groove and the other having a locking projection in the groove.

19. A spectacle temple comprising a non-metal member adapted to be hinged at the forward end, a flexible reinforcing member projecting rearward beyond the rear end of the non-metal member, and a flexible non-metal tube member mounted over the projecting portion of the reinforcing member, one of the non-metal members having a locking groove and the other a locking projection in the groove.

20. A spectacle temple comprising a member adapted to be hinged at the forward end and having a rear end portion, a reinforcing member projecting rearward beyond the rear end portion, and a helical non-metal tube mounted over the projecting portion of the reinforcing member and having a non-helical forward end portion, one of the said end portions having a groove and the other a projection in the groove.

21. A spectacle temple comprising a non-metal member adapted to be hinged at the forward end and having a rear end portion, a reinforcing member projecting rearward beyond the rear end portion, and a non-metal tube cut into helical form in the bore of which the projecting portion of the reinforcing member is mounted, the forward end of the tube not being helically cut, whereby a sleeve is provided at the forward end of the tube, the sleeve and the rear end portion being provided one with a groove and the other with a projection in the groove.

In testimony whereof, I have hereunto subscribed my name.

OSCAR HARRY FLODIN.